United States Patent
Elliott et al.

(10) Patent No.: US 10,545,476 B2
(45) Date of Patent: Jan. 28, 2020

(54) METHOD OF SELF-BALANCING PLURALITY OF MECHANICAL COMPONENTS WITHIN A TEMPERATURE CONTROL UNIT OF AN HVAC SYSTEM

(71) Applicant: Consolidated Energy Solutions Inc., Toronto (CA)

(72) Inventors: Bryan Elliott, Toronto (CA); Phillip Walker, Toronto (CA); Chris Au, Toronto (CA); Geoff Gomm, Toronto (CA); Thabet Belamri, Kitchener (CA); Kieran Bathgate, Toronto (CA); Marvin Gui, York (CA); Saman Zamanzadeh, North York (CA); Peter Hanna, Hamilton (CA)

(73) Assignee: CONSOLIDATED ENERGY SOLUTIONS INC., Toronto (CA)

( * ) Notice: Subject to any disclaimer, the term of this patent is extended or adjusted under 35 U.S.C. 154(b) by 349 days.

(21) Appl. No.: 14/605,868

(22) Filed: Jan. 26, 2015

(65) Prior Publication Data
US 2016/0216717 A1    Jul. 28, 2016

(51) Int. Cl.
*F24F 11/62*    (2018.01)
*G05B 19/10*    (2006.01)

(52) U.S. Cl.
CPC .................. *G05B 19/102* (2013.01)

(58) Field of Classification Search
CPC .................................................. F24F 11/006
See application file for complete search history.

(56) References Cited

U.S. PATENT DOCUMENTS

| | | |
|---|---|---|
| 2,338,382 A | 1/1944 | Marlow |
| 2,939,296 A | 6/1960 | Coblentz |
| 4,210,278 A | 7/1980 | Obler |
| 4,730,772 A | 3/1988 | Lortie et al. |
| 4,995,307 A * | 2/1991 | Floyd ............... F24F 3/044 454/255 |

(Continued)

OTHER PUBLICATIONS

European Search report received in EP 13839800 dated May 24, 2016.

*Primary Examiner* — Thomas C Lee
*Assistant Examiner* — Gary Collins
(74) *Attorney, Agent, or Firm* — Dorsey & Whitney LLP

(57) ABSTRACT

A method of self-balancing a plurality of mechanical components within a temperature control unit of an HVAC system. Each mechanical component is adjustable by the controller to vary airflow within the temperature control unit. For each mechanical components, a property is measured. An estimated condition of the mechanical component is calculated based on the measured property and known qualities of the temperature control unit. A desired condition for the mechanical component is determined based on a desired air condition within the HVAC system or building envelope. The estimated condition of the mechanical component is compared to the desired condition of the component. The condition of the mechanical component is changed using a controller to more closely align the estimated condition to the desired condition to achieve the desired indoor air condition. Steps are repeated until the difference between the estimated condition and desired condition is within a threshold value.

23 Claims, 5 Drawing Sheets

(56) References Cited

U.S. PATENT DOCUMENTS

| | | | | |
|---|---|---|---|---|
| 5,251,815 A * | 10/1993 | Foye | G05D 7/0635 | 236/49.3 |
| 5,597,354 A * | 1/1997 | Janu | F24F 11/0009 | 454/229 |
| 5,705,734 A * | 1/1998 | Ahmed | F24F 11/0001 | 454/256 |
| 5,786,525 A * | 7/1998 | Freund | F24F 3/044 | 73/1.34 |
| 5,884,492 A | 3/1999 | Zwicky | | |
| 6,006,142 A * | 12/1999 | Seem | F24F 11/0086 | 700/276 |
| 6,219,590 B1 * | 4/2001 | Bernaden, III | F24F 11/0086 | 700/277 |
| 6,386,281 B1 | 5/2002 | Ganesh et al. | | |
| 6,427,461 B1 | 8/2002 | Whinery et al. | | |
| 6,430,985 B1 * | 8/2002 | Drees | G01F 1/363 | 702/100 |
| 6,792,767 B1 | 9/2004 | Pargeter et al. | | |
| 2003/0197066 A1 * | 10/2003 | Hull | F24F 11/006 | 236/49.3 |
| 2004/0249597 A1 * | 12/2004 | Whitehead | G05B 19/042 | 702/118 |
| 2008/0004754 A1 * | 1/2008 | Pouchak | F24F 3/0442 | 700/276 |
| 2008/0015739 A1 * | 1/2008 | Wacker | F24F 11/0009 | 700/276 |
| 2011/0264275 A1 | 10/2011 | Thomle et al. | | |
| 2011/0264280 A1 | 10/2011 | Grabinger et al. | | |
| 2012/0239208 A1 * | 9/2012 | Federspiel | F24F 11/30 | 700/277 |
| 2012/0253524 A1 * | 10/2012 | Norrell | F24F 13/1426 | 700/277 |
| 2012/0253534 A1 | 10/2012 | Murata et al. | | |
| 2013/0248147 A1 * | 9/2013 | Wintemute | F28F 27/02 | 165/96 |
| 2013/0324027 A1 | 12/2013 | Davis | | |
| 2014/0277773 A1 * | 9/2014 | Goldschmidt | F24F 11/04 | 700/282 |
| 2015/0019022 A1 * | 1/2015 | Karamanos | G01F 15/003 | 700/276 |

\* cited by examiner

METHOD OF SELF-BALANCING PLURALITY OF MECHANICAL COMPONENTS WITHIN A TEMPERATURE CONTROL UNIT OF AN HVAC SYSTEM

TECHNICAL FIELD

This patent document relates generally to the broad field of varying flow rate through an air conditioning system. In particular, this patent document relates to the field of self-balancing a plurality of mechanical components within a temperature control unit of an HVAC system using a controller.

BACKGROUND

Heating, ventilation and air conditioning (HVAC) units are used to control desired air conditions inside of interior building spaces. Typical HVAC products require an air testing and balancer technician in order to measure and control the fresh air quantity entering the indoor space. The technician is required to go onto the roof and to manually adjust the damper position of the unit until the airflow the unit reaches the amount required by the design of the engineer.

In some jurisdictions, the fresh air amount must be maintained at levels high enough to meet ASHRAE IAQ requirements, but not too much as to induce an increased load to the space. The test and balancing process may become more complicated for smarter units due to the complications of various controls and actuators. Additionally, Demand Control Ventilation (DCV) and exhaust fan interlock may further complicate this problem and multiple tests may be required. The methodical regulation of system fluid flow through an HVAC unit is described as balancing.

Depending on the type of building, the desired conditions required may vary and the system also be required to adapt to changing conditions both inside and outside. Some typical HVAC systems provide only reactive responses to changing conditions. For example, if pressure decreases, an outside air damper may be turned to an open position for a period of time. Reactive changes to the system may result in inefficiency and energy loss.

In some applications, certain conditions may require more careful control and balancing of the HVAC system. In particular, supermarkets or grocery stories have particular requirements, and these requirements may require carefully controlling space humidity levels. Moisture control is a central concern for a supermarket; too much moisture negatively affects the refrigeration system, and too little moisture negatively affects the fresh fruit and vegetables.

Various methods of balancing HVAC units and controlling air conditions in interior building spaces have been attempted.

Pargeter et al. (U.S. Pat. No. 6,792,767) describes a control system for a heating, ventilation, and air conditioning (HVAC) unit for controlling the humidity and temperature of interior building space at desired levels regardless of the outside temperature and humidity conditions. The control system employs a combination of modulated return air bypass, modulated capacity compressor, and modulating hot gas reheat. Pargeter does not describe a way of independently controlling the airflow across the cooling coil and the airflow bypassing the cooling coil for fine temperature and humidity adjustments.

Other patents that relate to the general field of HVAC systems include:
US Patent Publication No. 2013/0324027;
US Patent Publication No. 2012/0253534;
US Patent Publication No. 2011/0264280;
US Patent Publication No. 2011/0264275; and
U.S. Pat. No. 4,210,278.

SUMMARY

In an embodiment there is a method of self-balancing a plurality of mechanical components within a temperature control unit of an HVAC system using a controller. Each of the plurality of mechanical components is adjustable by the controller to vary airflow within the temperature control unit. For each of the plurality of mechanical components, the following steps are applied:
  i. measuring a pressure value associated with the mechanical component having a current property;
  ii. determining a desired airflow through the temperature control unit;
  iii. calculating an estimation of a desired property of the mechanical component based on the measured pressure value, the desired airflow and known qualities of the temperature control unit;
  iv. changing the current property of the mechanical component to the estimated desired property; and
  v. repeating the steps (i) through (iv) until a set precondition is met.

In another embodiment there is a method of varying a flow rate through at least one damper within a temperature control unit of an HVAC system using a controller. A pressure is measured inside the temperature control unit. An estimated value of a flow rate through the at least one damper is calculated based on the measured pressure and based on known qualities of the temperature control unit. A desired flow rate through the at least one damper is determined based on a desired indoor air condition within the building envelope. The estimated flow rate is compared to the desired flow rate. The position of the at least one damper is changed to more closely align the estimated flow rate to the desired flow rate to achieve the desired indoor air quality.

In another embodiment there is a method of self-balancing a plurality of mechanical components within a temperature control unit of an HVAC system using a controller. Each of the plurality of mechanical components is adjustable by the controller to vary airflow within the temperature control unit. For each of the plurality of mechanical components, a property of the mechanical component is measured. An estimated condition of the mechanical component is calculated based on the measured property and based on known qualities of the temperature control unit. A desired condition for the component is determined based on a desired air condition within the HVAC system or building envelope. The estimated condition of the component is compared to the desired condition of the component. The condition of the component is changed using the controller to more closely align the estimated condition to the desired condition to achieve the desired indoor air condition. Those steps are repeated until the difference between the estimated condition of the component and the desired condition of the component is within a threshold value.

There is in another embodiment a method of self-balancing a plurality of mechanical components within a temperature control unit of an HVAC system using a controller. The plurality of components include at least one damper. Each of the mechanical components have conditions that are adjustable by the controller for varying the airflow within the temperature control unit the method comprising. Each of the plurality of mechanical components is calibrated independently from each other by carrying out the following steps for each of the plurality of components. A property of the mechanical component is measured. An estimated condition of the mechanical component is calculated based on the measured property and based on known qualities of the temperature control unit. A desired condition for the component is determined based on a desired air condition within the HVAC system or building envelope. The estimated condition of the component is compared to the desired condition of the component. The condition of the component is changed using the controller to more closely align the estimated condition to the desired condition to achieve the desired indoor air condition. Those steps are repeated until the difference between the estimated condition of the component and the desired condition of the component is within a threshold value for that component. After each of the plurality of mechanical components has been independently calibrated once, the independent calibration of each of the plurality of components is repeated until each of the plurality of mechanical components has a desired condition that differs from the estimated condition by less than the threshold value for each of the plurality of mechanical components.

BRIEF DESCRIPTION OF THE DRAWINGS

Reference will now be made to preferred embodiments of this method and system, by way of example only, with reference to the following figures in which.

DETAILED DESCRIPTION OF THE PREFERRED EMBODIMENTS

There is described herein a self-balancing strategy for HVAC systems which may determine the airflow rate through a number of dampers and fans within the HVAC system. Before the method is discussed in detail, an exemplary air conditional system or HVAC unit is described to provide a context for the implementation of the method discussed below.

Figure 1:
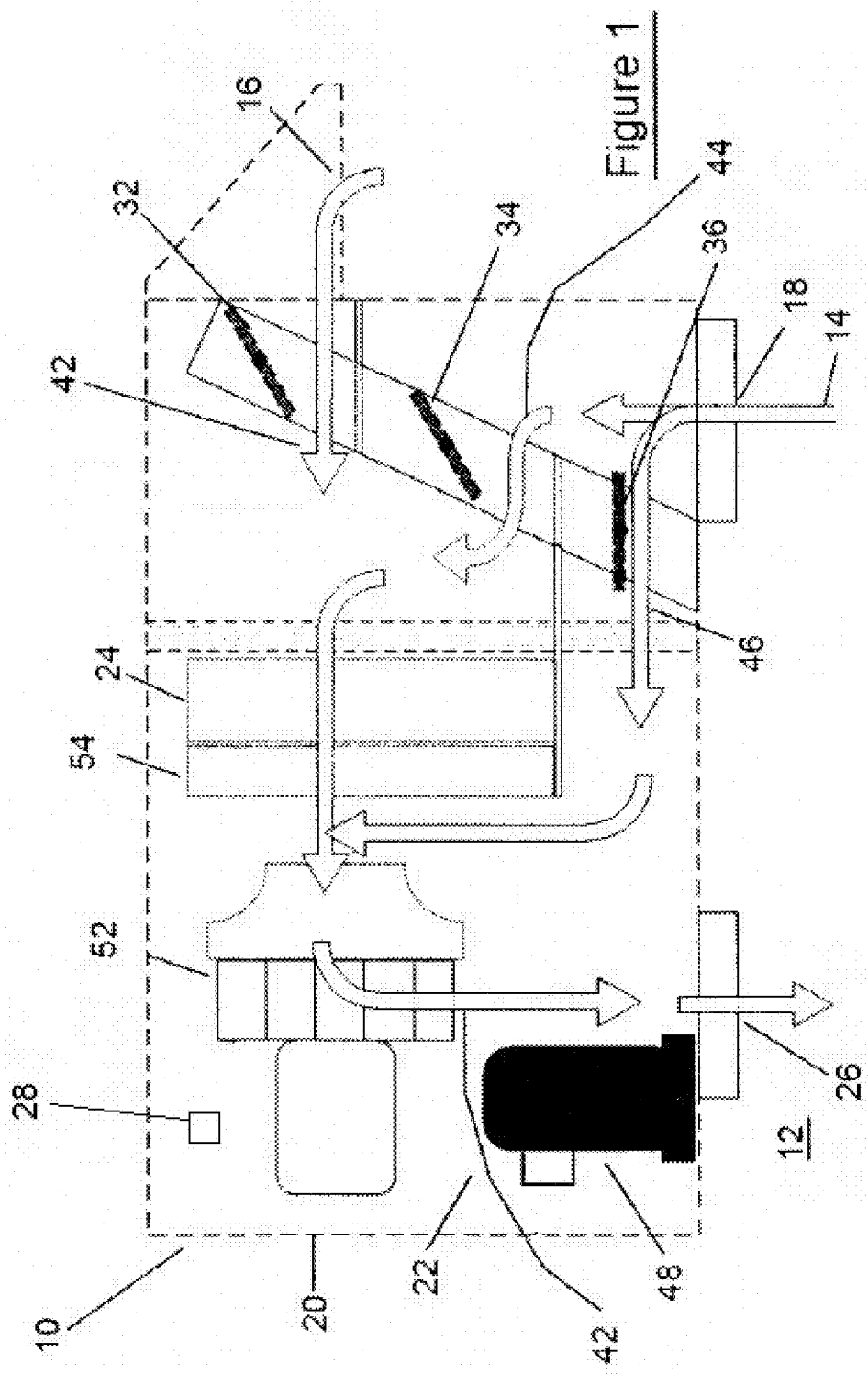
FIG. 1 is a top plan system view of an exemplary HVAC system.

FIG. 1 depicts an exemplary air conditioning system, denoted generally as 10. When deployed in or near an interior space 12 of a structure, the system 10 may dehumidify, cool, and circulate air 14 through the interior space 12. The system 10 comprises a housing 20 defining a chamber 22, a cooling and dehumidifying coil 24 located in the chamber 22, a humidity sensor (not shown) located in the interior space 12 for measuring a humidity level in the interior space 12, an outside air damper 32, a return air damper 34, a bypass air damper 36, and a controller 40. Other conditions within the interior space, such as $CO_2$ levels, air pressure, temperature and other conditions may also be measured inside the interior space.

The housing defines an outside air inlet 16 for receiving outside air into the chamber 22, a return air inlet 18 for receiving return air from the interior space into the chamber 22, and an outlet 26 for delivering air 14 from the chamber 22 to said interior space 12. The housing 20 further defines a first airflow path 42 therein communicating between the outside air inlet 16 over the coil 24 and the outlet 26 for delivering outside air from the outside air inlet 16 over the coil 24 to the interior space 12. The system 10 further defines a second airflow path 44 between the return air inlet 18 over the coil 24 and to the outlet 26 for delivering return air from the interior space 12 over the coil 24 to the interior space 12. The housing 20 further defines a third airflow path 46 between said return air inlet 18 and the outlet 26 for delivering return air through the chamber 22 to the interior space 12 without passing over the coil 24. The outside air damper 32 is sequentially moveable between an open position permitting outside air to flow through said first airflow path 42 and a closed position where the outside air damper 32 is closed. The return air damper 34 is sequentially moveable between an open position permitting return air to flow through said second airflow path 44, and a closed position where the return air is prevented from flowing through said second airflow path 44 and over said coil 24. The bypass air damper 36 is sequentially moveable between a closed position permitting return air to flow to the second airflow path 44 while preventing return air from flowing into the third airflow path 46, and an open position where the return airflows through both the second 44 and third 46 airflow paths. The controller 40 is configured to independently control the opening and closing of the outside air damper 32, the return air damper 34 and the bypass air damper 36 through intermediate positions between the open and closed positions in response to data received from the sensor within the interior space (not shown), as is discussed in more detail below.

The system 10 includes a supply fan 52 for circulating air through the first 42, second 44, and third 46 airflow paths. Other means for circulating air as known to a person skilled in the art may be used. The fan 52 may be a rotational fan located preferably within the housing 20 or chamber 22 downstream of the cooling coil 24. The fan 52 may be connected to the controller 40 and may be connected to a variable frequency drive. The controller 40 may be further configured to control rotation of the fan 52 to suck outside air through the first airflow path 42, return air through the second airflow path 44, and return air through the third airflow path 46. The system 10 may also comprise additional fans (not shown) each disposed in one of the airflow paths 42, 44, and 46, each additional fan also connected to the controller 40 such that the controller may more finely control the volume of return air and outside air traveling through each of the airflow paths 42, 44, and 46.

The system 10 may further include a sensor (not shown) located in said interior space 12, connected to the controller 40. The controller has a temperature sensor. The sensors may be included with a controller exterior of the unit but the necessary measurements are relayed to controller 40. The temperature sensor 28 is preferably a dew point temperature sensor and may measure temperature level of air 14 in the interior space and transmit the temperature measurement to the controller 40. The controller 40 may be further configured to independently control the opening and closing of the outside air damper 32, the return air damper 34 and the bypass damper 36 through intermediate positions between the open and closed positions in response to the temperature measurement, preferably dew point temperature, received from the temperature sensor 28. When controller 40 does not demand for dehumidification, as the interior space is within the control limits, but temperature sensor 28 relates a high space temperature to controller 40, the interior space temperature relayed to controller 40 will provide independent control of the opening and closing positioning of the return air damper 34 and bypass air damper 36. The system may further include a cooling compressor 48 in fluid connection with the cooling coil 24. The cooling compressor 48 may be configured to supply a flow of coolant through the cooling coil 24 at a coolant suction pressure determined by the compressor-capacity output. Capacity output refers to the output percentage demanded by controller 40 to compressor 48 to maintain the desired suction pressure setpoint of the cooling coil 24. The capacity output varies by an analog signal by the controller 40 to the compressor module controller. The compressor 48 may be connected to the controller 40 to transmit compressor 48 data to the controller 40, the compressor 48 data including a measurement of compressor capacity output and a measure of coolant suction pressure. The controller 40 may be configured to independently control the compressor capacity output in response to data received from said humidity or dew point sensor thereby varying the coolant suction pressure and the temperature of the cooling coil 24. The controller 40 sends an analog signal to the compressor module that states the amount of capacity required based upon measurement of the suction pressure. The suction pressure setpoint is established by the dew point temperature, which is either read from a sensor or calculated in controller 40 by use of temperature and humidity. It is the dew point temperature that also controls the return air and bypass air dampers along with the suction pressure. As the dew point temperature increases, the cooling coil temperature gets colder, so the suction pressure setpoint is lowered. This results in the return air damper closing more and the bypass air damper opening more. The temperature sensor, humidity sensor, and dew point measurements may be relayed through an analog output. During dehumidification dew point temperature, whether it be directly read from a dew point sensor or calculated in the controller via temperature and humidity that is the main measurement for suction pressure setpoint and damper modulation. During cooling the space due point is low and suction pressure will modulate. The dampers will generally modulate during heating and recirculation. Damper modulation will alter based upon suction pressure at a certain state, but the dew point temperature will be the primary beginning point of where the damper position should be. As the suction pressure floats, the dampers will modulate to maintain suction pressure at certain states.

In one implementation, where the dew point measurement, being either read directly from the dew point sensor or calculated by use of the temperature sensor and humidity sensor, from a sensor within the interior space measures greater than a predetermined dew point temperature threshold, the controller 40 may be configured to reposition the bypass air damper 36 towards the open position to increase the amount of return air traveling through the third airflow path 46 bypassing the cooling coil 24. In this way, the coolant suction pressure may be reduced as less air is traveling across the coil 24. This reduces the air velocity across the cooling coil. Typically fresh outside air entering the interior space 12 through the outside air inlet 16 has a higher humidity measurement, or amount of moisture than the return air. In another implementation, where the dew point measurement measures greater than a predetermined dew point threshold, the controller 40 may be configured to reposition the return air damper 34 towards the closed position to decrease the amount of return air traveling through the second airflow path across the cooling coil. The return air damper can fully close to allow 100% isolation of the outside air. As the interior dew point temperature rises, this is the measured or calculated dew point temperature that represents the interior temperature at which the water vapor changes phase to a liquid, it is primarily due to the outside air. By isolating the outside air via opening the bypass damper to a greater position and closing the return air damper to a smaller position, the outside air can be fully dehumidified. This results in a larger amount of the return air being bypassed, which is advantageous. When the outside air is isolated and more store air is being bypassed, the cooling coil temperature easily drops. The cooling coil SHR, being the sensible heat ratio of the coil, drops quite low and more of the cooling coil is dedicated to removing latent energy. A byproduct of this process is sensible cooling, and a cold and dry off-coil, off-coil referring to the air leaving the cooling coil, air condition will not only reduce the interior dew point temperature, but it will also cause the interior temperature to fall. The greater quantity of store bypass air that has not been treated mixes with the cold and dry off-coil air and this helps with increasing the final air temperature that is delivered to the interior space. The modulation of the dampers aids in this process called "overcooling of the airstream." As the dampers modulate, a certain quantity of store bypassed air is always mixing with the cold and dry off-coil air. This greatly aids in decreasing the "overcooling" effect of the dehumidification process. By both opening the bypass air damper 36 and closing the return air damper 34 simultaneously, even greater dehumidification of the outside air may be achieved than simply modulating one of the dampers 36 and 34. Maximum dehumidification may be achieved by system 10 where the controller 40 fully opens the bypass air damper 36 and fully closes the return air damper 34. In this configuration, the cooling compressor 48 may be operating at maximum capacity output in order to extract moisture from the outside air traveling across the coil 24. Preferably, the dew point may be controlled by the controller 40 continuously making small adjustments to the bypass 36 and return air dampers 38 in order to maintain a relatively constant space air 14. This air represents the space dew point temperature. The dew point returning to the unit via the return air path is not necessarily identical to the space dew point temperature. The air 14 relates to the actual interior space condition, being temperature and dew point, which is relayed to controller 40.

In one implementation, where the dew point measurement from the sensor within the interior space measures less than a predetermined humidity threshold programmed into the controller 40, the controller 40 may be configured to reposition the bypass air damper 36 towards the closed position to decrease the amount of return air traveling through the third airflow path 46 bypassing the cooling coil 24. The peak efficiency of the unit is when the bypass damper is open. The maximum peak dehumidification performance is achieved when the return air damper is fully closed and the bypass air damper is fully open. This allows the outside air to be fully isolated and the coil SHR (sensible heat ratio) to be at its lowest position. The digital compressor has a greater operating efficiency when the capacity output is above 51%. The operating envelope of the compressor has a greater capacity output when compared to its motor kW input is more favorable when the compressor capacity is above 51%. The compressor motor kW is not linear to its capacity output. Lower capacity output of the compressor will have an overall lower energy efficiency ratio, being EER which is a ratio of the compressor capacity output to the motor input watts. The controller 40 takes this into consideration, as it attempts to keep the compressor output capacity at a higher energy efficiency ratio. This is achieved by modulating the dampers. This strategy takes place only when the unit is in full dehumidification and the suction pressure setpoint is at its lowest limit. If the suction pressure setpoint is at its lowest limit, the space dew point is at its highest measurement or it is surpass the highest measurement. If the digital scroll begins to modulate at this point, it indicates that the load is reducing as it requires less capacity to maintain the desired suction pressure setpoint. If the digital scroll begins to modulate at this point, the bypass air damper will close slightly and the return air damper will open slightly. This allows a greater amount of air to pass over the cooling coil, which increases the quantity of air and air velocity across the cooling coil. The final effect is a greater load for the cooling coil; consequently, this increases the heat load absorbed by the refrigerant (coolant)—the latent heat of vaporization. Since a greater amount of store air is now passing over the cooling coil, the damper positions and dew point temperature setpoint are reset. As the space dew point drops, the dampers continue to change and the suction pressure setpoint continues to rise. The suction pressure setpoint rises as a higher coil SHR is required; therefore, the overall compressor capacity of the unit required to maintain the desired suction pressure setpoint is less. This is continually repeated until the dew point temperature reaches its lowest limit and the unit compressors shutdown. Similarly, in one implementation, where the humidity measurement from the sensor within the interior space measures less than a predetermined humidity threshold programmed into the controller 40, the controller 40 may be configured to reposition the return air damper 34 towards the open position to increase the amount of return air traveling through the second airflow path 44 across the cooling coil 24. By closing the bypass air damper 36 and opening the return air damper 34, more return air will be traveling through second airflow path 44 across the cooling coil 24, meaning that more return air will be cooled by the cooling coil 24. Where the bypass air damper 36 is fully closed and the return air damper 34 is fully open, maximum cooling efficiency of the system 10 will be achieved.

The controller may be further configured to independently reposition the bypass air damper 36, the return air damper 34, and the outdoor air damper 32 in order to maintain the dew point measurement within a predetermined dew point range prior to repositioning the bypass air damper 36, the return air damper 34, and the outdoor air damper 32 in order to maintain the temperature measurement within a predetermined temperature range. Refrigerated display cases are effective dehumidifiers, and the desired dew point limits can be designed around the refrigerated display cases. Since the cases are designed for a maximum dew point temperature of 58° F., a maximum limit of 50° F. guarantees a lesser load on the refrigeration system. A typical "ramp-up" of the compressors to begin the dehumidification sequence takes place when the interior space is at a dew point temperature of 47.8° F. This guarantees a pre-emptive start prior to reaching the maximum limit. It is at this point that the cooling coil SHR is at its highest, the suction pressure setpoint is at its highest, and the return air is at its beginning opening position, which is its largest opening position, and the bypass is at its beginning opening position, which is its smallest opening position. When the interior space dew point temperature is furthest from the desired maximum dew point setpoint, the maximum amount of allowable air to pass the DX Cooling Coil throughout the dehumidification strategy is at this beginning point. Accordingly, where there are competing predetermined settings for both space dew point and temperature programmed into the controller 40, the controller may be programmed to modulate the dampers 32, 34, and 36 to match the measured dew point with the desired dew point in advance of attempting to match the desired temperature. In this implementation, only when moisture in the air has reached an acceptable level will the controller attempt to change the air 14 temperature by modulating the dampers 32, 34, and 36.

Any air that is routed across the coil 24 in the first 42 or second 44 airflow paths may be cooled a greater amount than air bypassing the coil 24 in the third airflow path 46. It will be cooled to a greater amount as it passes through the cooling coil when the cooling coil is active. Where the controller 40 receives a measurement from temperature sensor 28 that is a greater value than programmed into the controller 40 (in other words, the space air 14 temperature is higher than desired), the controller 40 may independently control the dampers 32, 34, and 36 to route more return air across the coil 24. Where the controller 40 is programmed so that dew point has a higher priority than temperature (when the interior space dew point temperature is satisfied but a high space temperature exists), and the controller 40 determines that the temperature measurement from temperature sensor 28 is within a predetermined temperature range, then the controller may control the dampers 32, 34, and 36 to route less return air across the coil 24, if needed to greater reduce the moisture content of the outside air traveling through the first airflow path 42. This is completely proportional to the interior space dew point. As the interior space dew point rises, the suction pressure setpoint continues to drop. This decreases the cooling coil SHR. Space dew point temperature typically rises due to the fresh air. The fresh air load for a typical supermarket is the largest load source; therefore, the interior space moisture content rises due to the fresh air. The controller catches this rise in dew point temperature and executes the detailed strategy of floating the suction pressure and modulating the dampers.

When there exists only a temperature demand, or "cool" demand, and the interior space dew points satisfied, the cooling coil temperature required is not as aggressive as dehumidification. The suction pressure setpoint is elevated; consequently, the DX cooling coil SHR is more elevated. This allows a greater percentage of the coil to be dedicated to sensible cooling (temperature). The suction pressure continues to float based upon the high space temperature. As the space temperature rises, the suction pressure drops; however, it will never drop to a condition identical to dehumidification requirement. The compressor capacity output in this scenario is much less than that of the dehumidification sequence.

The digital scroll compressor is the mechanical pump the controls the mass flow rate of the refrigerant, or coolant as it has been described. The control of the mass flow rate is what controls the overall refrigeration effect, and this is controlled by the desired suction pressure setpoint. The unit can include multiple compressors. There can be multiple combinations of compressors that are broken into individual suction groups. This allows them to control differently based upon the described space conditions. Multiple combinations of compressor groups, or known as suction groups, make it possible to have independent suction set points. A suction set point is the desired control saturation temperature of the refrigeration (coolant). This is the temperature of when the liquid refrigerant changes phase from a liquid to a vapour, which is entitled the latent heat of vaporization. The lower the set point will accommodate a lower (colder) refrigerant (coolant) saturation temperature. This will cause a lower (colder) cooling coil temperature, which is a lower coil SHR. Maximum dehumidification strategy will have the bypass air damper fully opened, the return air damper fully closed, and the suction set point at its lowest point, which is typically 33° F. Maximum dehumidification strategy occurs when the interior space dew point is at its highest allowable limit, which is typically 50.2° F.; therefore, the suction pressure set point is at its lowest possible temperature set point when the interior space dew point is at its highest allowable limit. When multiple combinations of compressor grouping is used, a variation in suction pressure set point for the dedicated compressor group is utilized. For example, four compressors have two independent suction grouping. Each group is independent of the other, such that four compressors would have two independent suction groups. Each group would thus have two compressors, and each compressor "grouping" would have its own dedicated suction pressure set point. This set point floats based upon the interior space dew point (dehumidification) and temperature (cooling), such as previously defined.

In another implementation, the system 10 may further comprise a suction pressure sensor 28 located in fluid connection with the cooling coil 24 and the cooling compressor 48. The sensor 28 may make a measurement of suction pressure in the coolant fluid traveling between the cooling compressor 48 to the coil 24. The sensor 28 may be connected to the controller 40 and communicate the suction pressure measurement to the controller 40. The controller 40 may be further configured to independently control the opening and closing of the outside air damper, the return air damper and the bypass damper through intermediate positions between the open and closed positions in response to data received from said suction pressure sensor. As explained previously, in order to operate system 10 efficiently, it may be preferable to maintain a constant load across the cooling coil 24 such that the compressor 48 power and coolant suction pressure may remain constant. Once desired dew point or temperature levels have been achieved in the interior space air, the controller 40 may be configured to modulate dampers 32, 34, and 36 to route as much return air and outside air as possible across the cooling coil 24 in order to maintain constant compressor power 48 and coolant suction pressure. In other words, the controller 40 may be further configured to reposition the bypass air damper 36 towards the closed position in response to the temperature measurement measuring within a predetermined temperature range and the dew point measurement measuring within a predetermined dew point range. However, if the desired temperature could not be achieved by modulating the dampers 32, 34, and 36 to maximum positions, the controller 40 may control the compressor 48 to independently increase coolant suction pressure in response to the temperature measurement measuring less than a predetermined temperature threshold. Similarly, where the temperature measurement measures greater than a predetermined temperature threshold, the controller 40 may control the cooling compressor 48 to decrease the coolant suction pressure below a predetermined coolant suction pressure threshold. The controller may control the cooling compressor 48 in this way in response to the temperature measurement of the temperature sensor (not shown) measuring within a predetermined temperature range and the dew point measurement of the sensor within the interior space measuring within a predetermined dew point range.

By the controller 40 being capable of making adjustments to each of the dampers 32, 34, and 36 in order to finely control the dew point and temperature of the space air 14, the system 10 does not require use of a hot gas reheating coil 54. However, in one implementation, as optionally shown in FIG. 1 a hot gas reheat coil 54 may be optionally disposed in the chamber 22 downstream of the cooling coil 24 in the first airflow path 42. The reheat coil is capable of increasing the temperature of cooling coil off-coil air by passing across the reheating coil 54 in the first 42 and second 44 airflow paths, respectively. The reheat coil can be connected to the controller, so the controller determines when the enabling of the reheat coil is required based upon the interior space temperature.

The controller 40 may be further configured to independently reposition each of the return air damper and the bypass air damper prior to controlling the cooling compressor 48 coolant suction pressure or power output in order to maintain the humidity or temperature of the space air 14 within predetermined humidity and temperature ranges, respectively.

In addition to controlling dew point and temperature, the controller 40 may also control the dampers 32, 34, and 36 in order to maintain the total amount of air 14 in the chamber 22 between predetermined minimum and maximum air volumes. In particular, the controller may be further configured to reposition the outdoor air damper 32 towards the open position to increase the amount of outside air traveling through the first airflow path 42 in response to the bypass air damper 36 and return air damper 34 being opened to a predetermined position thereby maintaining a total volume of air traveling through the first airflow path 42 and the second airflow path 44 above a predetermined minimum system airflow volume. The outdoor air damper 32 may be positioned at various intermediate positions between open and closed, or the controller 40 may be configured to position the outside air damper 32 at only particular predetermined positions in order to more easily predict the effects of modulating the return 34 and bypass 36 air dampers on the system 10. As a certain quantity of outside air is always required throughout the occupancy of the building to maintain a desired positive pressurization, there may be a predetermined minimum or maximum open or closed position of the outside air damper 32 programmed into the controller 40. In order to maintain a minimum amount of airflow through the first 42 and second 44 airflow paths, there may be a predetermined maximum amount of air programmed into controller 40 that may be bypassed around the coil 24. In one implementation, the maximum amount of air that may be bypassed may be approximately 9000 cubic feet per minute (CFM) in a larger system 10 designed for a larger interior space 12, or approximately 4000 CFM in a smaller system 10 designed for a smaller interior space 12.

In an implementation, each of the each of the bypass air damper 36, return air damper 34, and outdoor air damper 32 may be mounted to the housing 20 through a respective damper gear (not shown), each damper gear being mechanically linked to a respective independent control gear (not shown), the controller 40 being further configured to independently control the opening and closing of the outside air damper 32, the return air damper 34 and the bypass damper 36 through intermediate positions between the open and closed positions by actuating the respective independent control gear in response to data received from said sensor within the interior space. In the preferred embodiment of the present invention, the dampers move in response to the Belimo Actuator which is a motor driven mechanism. The Belimo Actuator is attached to a linked gear assembly, and they turn in response to the Belimo Actuator moving.

As a person skilled in the art will appreciate, there are different ways to move the dampers so long as fine adjustments of damper positions are possible.

The controller 40 may be a computing device configured to perform the controlling functionality described herein. In this implementation, the controller 40 may include a data processor and an input/output subsystem. The data processor controls the overall operation of the controller, and may comprise a microprocessor in communication with non-volatile memory and volatile memory (random access memory, or RAM). Either the non-volatile memory or RAM may include computer processing instructions, which when executed by the microprocessor, implement an operating system, and computer programs. Alternately, the computer processing instructions may be copied from the non-volatile memory to the RAM upon reset or power-up of the controller 40, or at any other time when the controller 40 is powered on, and executed by the microprocessor out of the RAM. Preferably, once the system 10 is installed, the controller 40 is powered on and remains on. The non-volatile memory may comprise flash memory, read-only memory, one or more magnetic hard drives or other magnetic or optical media. The input/output subsystem is in communication with the data processor. The input/output subsystem may comprise input ports for connecting communication cables between the controller 40 and each of the dampers 32, 34, and 36, and between the controller 40 and each of the dew point and temperature sensors. Alternatively, the dampers 32, 34, and 36 may communicate wirelessly with the controller 40 through a wireless communications interface supported by the input/output subsystem. The operating system of the data processor allows the controller 40 to operate the input/output subsystem in that data received from each sensor by the input/output subsystem is communicated by the input/output subsystem to the data processor. The data processor may compare the received sensor data to predetermined temperature and humidity thresholds stored in either the non-volatile memory or RAM, and send control signals through the input/output subsystem to at least one of the dampers 32, 34, and 36 in accordance with predetermined damper profiles to change either the temperature or humidity levels of air in the space 12 entering the system 10. The controller could also be on a network.

In another implementation, the controller 40 may be a microcontroller including a processor core, memory, and input/output subsystem connected to each element being controlled. Microcontroller memory is preferably non-volatile memory, and may include flash memory and read-only memory containing operation instructions that when executed by the processor core cause the controller to perform as described herein.

In one embodiment a differential static pressure transducer (not shown) will be placed on either side of each of the dampers and supply fan. Using the differential pressure sensors a set of Bernouilli's equations are used to determine the flowrate through the dampers.

Figure 2:
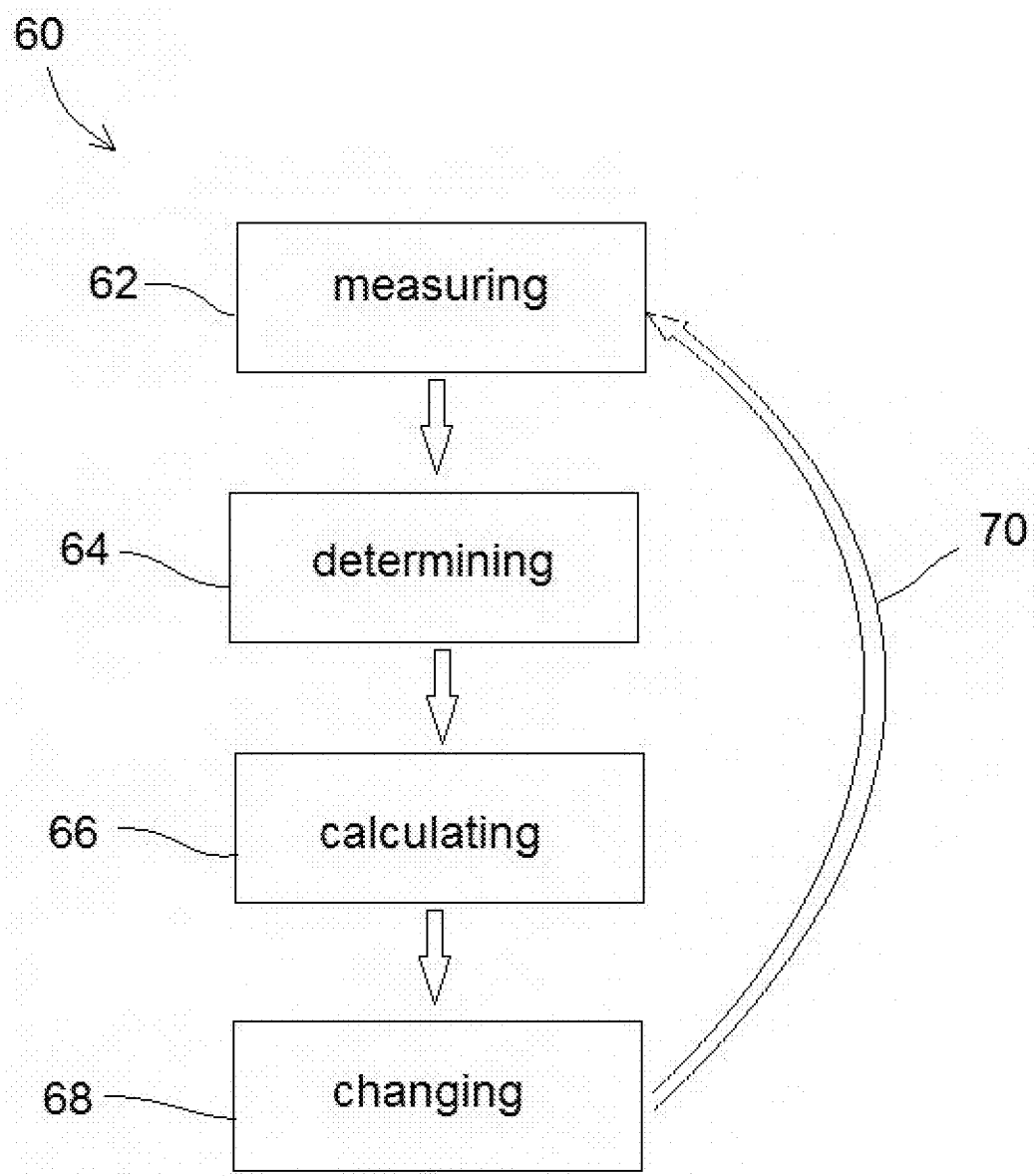
FIG. 2 is a flow diagram showing an embodiment of a method of self-balancing a plurality of mechanical components within a temperature control unit.

FIG. 2 shows a method of varying a property, such as flow rate, through a mechanical component such as a damper or fan, within a temperature control unit of an HVAC system, such as is shown in FIG. 1.

Denoted generally at 60, there is set out a method of self-balancing a plurality of mechanical components within a temperature control unit of an HVAC system using a controller. Each of the plurality of mechanical components within the method are adjustable by the controller to vary airflow within the temperature control unit. The method is applied to each of the plurality of mechanical components. The mechanical components may include the dampers within the control unit and the fans within the unit.

At 62, a pressure value associated with the mechanical component is measured. In a preferred embodiment, the pressure value is a different pressure across the mechanical component. The mechanical component has a current property which is known to the controller. The current property may be the current position of a damper or the speed of a fan.

At 64, a desired airflow through the temperature control unit is determined. The desired airflow may be based on desired air properties within the interior space or may be an arbitrary value selected during testing.

At 66, an estimation of a desired property of the mechanical component is calculated based on the measured pressure value, the desired airflow and known qualities of the temperature control unit. Known qualities of the temperature control unit may include, for example, the factor of opening of the damper, the cross-sectional area of the flow path for the damper and the pressure loss coefficient for the damper. Estimating a condition of each of the plurality of dampers may include estimating a value of a flow rate across a damper or supply fan.

At 68, the current property of the mechanical component is changed or adjusted to the estimated desired property. This may include adjusting the position of a damper or changing the speed of a fan.

At 70, the steps 62 to 68 are repeated until a set precondition is met. The set precondition is met when the calculated difference between the desired property of the component and the current property of the component is within a threshold value or when a predetermined time interval has elapsed.

The plurality of mechanical components within the temperature control unit may be a plurality of dampers, and in which the steps in FIG. 2 are repeated sequentially for each of the plurality of dampers. When the method is run for a plurality of dampers, preferably measuring a pressure value of each of the plurality of dampers is carried out by measuring a differential pressure across the damper and the desired property of each of the plurality of dampers is the position of the damper and the current property of each of the plurality of dampers is the current position of the damper. As set out in the example in FIG. 1, the plurality of mechanical components may include an outdoor air damper, a return air damper and a bypass air damper and in which the method steps set out in FIG. 2 are repeated for each of the outdoor air damper, the return air damper and the bypass air damper. The method may also be applied to a supply fan, such as fan 52 (FIG. 1). Measuring a pressure value of the supply fan may be performed by determining a differential pressure across the supply fan and the desired property of the supply fan may be a desired airflow rate across the supply fan. The method may also be applied to additional fans within the system, if additional fans are used.

The method steps in FIG. 2 may be initially carried out sequentially for each of the plurality of mechanical components, and once the steps have been carried out for each of the plurality of components a first time, the steps are re-run multiple times for each component sequentially for each of the plurality of mechanical components. The calculation steps in FIG. 2 may be carried out during an initial calibration of the HVAC system onsite. The controller may be programmed to automatically repeat the method steps in FIG. 2 for each of the plurality of mechanical components when the controller requires a change in flow rate.

Figure 3:
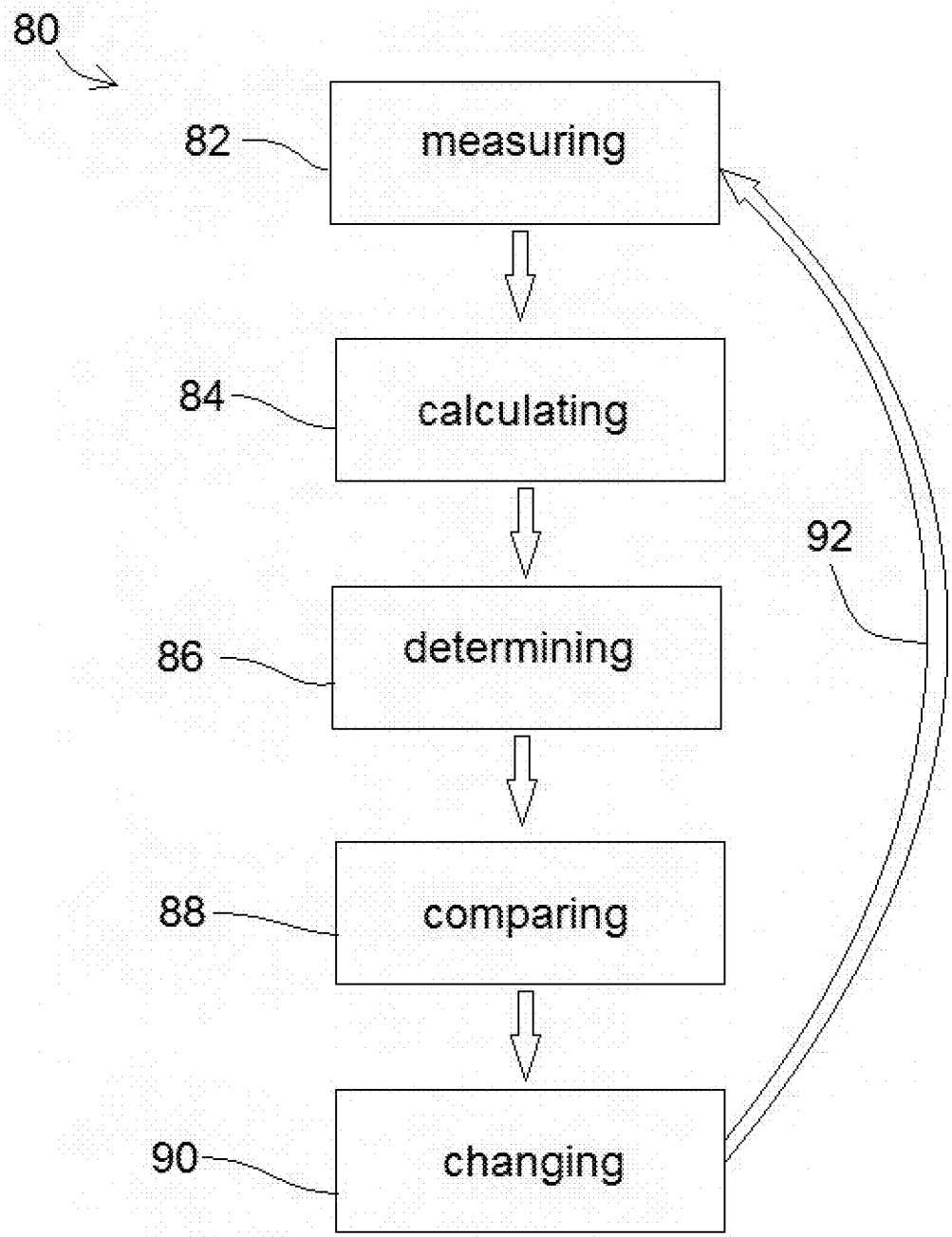
FIG. 3 is a flow diagram showing another embodiment of a method of self-balancing a plurality of mechanical components within a temperature control unit of an HVAC system.

FIG. 3 shows another embodiment of a method of varying a property, such as flow rate, through a mechanical component within a temperature control unit of an HVAC system generally denoted by 80. At 82, the controller 40 measures a property of the mechanical component. The property may be a pressure reading associated with the mechanical component. For example, the pressure being measured inside the temperature unit is preferably a differential pressure reading taken across the damper or other mechanical component such as a supply fan.

At 84, an estimated condition of the mechanical component is calculated based on the measured property and based on known qualities of the temperature control unit. Known qualities of the temperature control unit may include, for example, the factor of opening of the damper, the cross-sectional area of the flow path for the damper and the pressure loss coefficient for the damper. Estimating a condition of each of the plurality of dampers may include estimating a value of a flow rate across a damper or supply fan.

At 86, a desired condition, such as a desired flow rate, for the component is determined based on a desired indoor air condition within the building envelope or within the HVAC system itself. For example, it may be desired to increase the airflow through the system, change the humidity level or change $CO_2$ values, among other things. The properties within the HVAC temperature control unit itself may also be determined in order to provide test conditions which can be accurately measured.

At 88, the estimated condition of the component is compared to the desired condition of the component. For example, the estimated flow rate across the mechanical component may be compared to the desired flow rate.

At 90, the condition of the component is changed using the controller 40 to more closely align the estimated condition to the desired condition to achieve the desired indoor air condition. For example, the position of the damper may be changed to more closely align the estimated flow rate to the desired flow rate to achieve the desired indoor air quality.

At 92, if necessary, the steps 82 to 90 are repeated for the mechanical component until the difference between the estimated flow rate and the desired flow rate is less than a pre-determined threshold value. The number of repetitions the method steps in FIG. 3 may be repeated based on a pre-determined threshold and a timed value. After a set time has passed since modulation began, if all mechanical parts are not within a desired threshold, the unit will continue to modulate. This is true even if one part is not in the desired threshold since the modulation of each part will affect the others. If the unit is not within a desired threshold a new time limit will be applied and all parts will continue to modulate.

Figure 5:
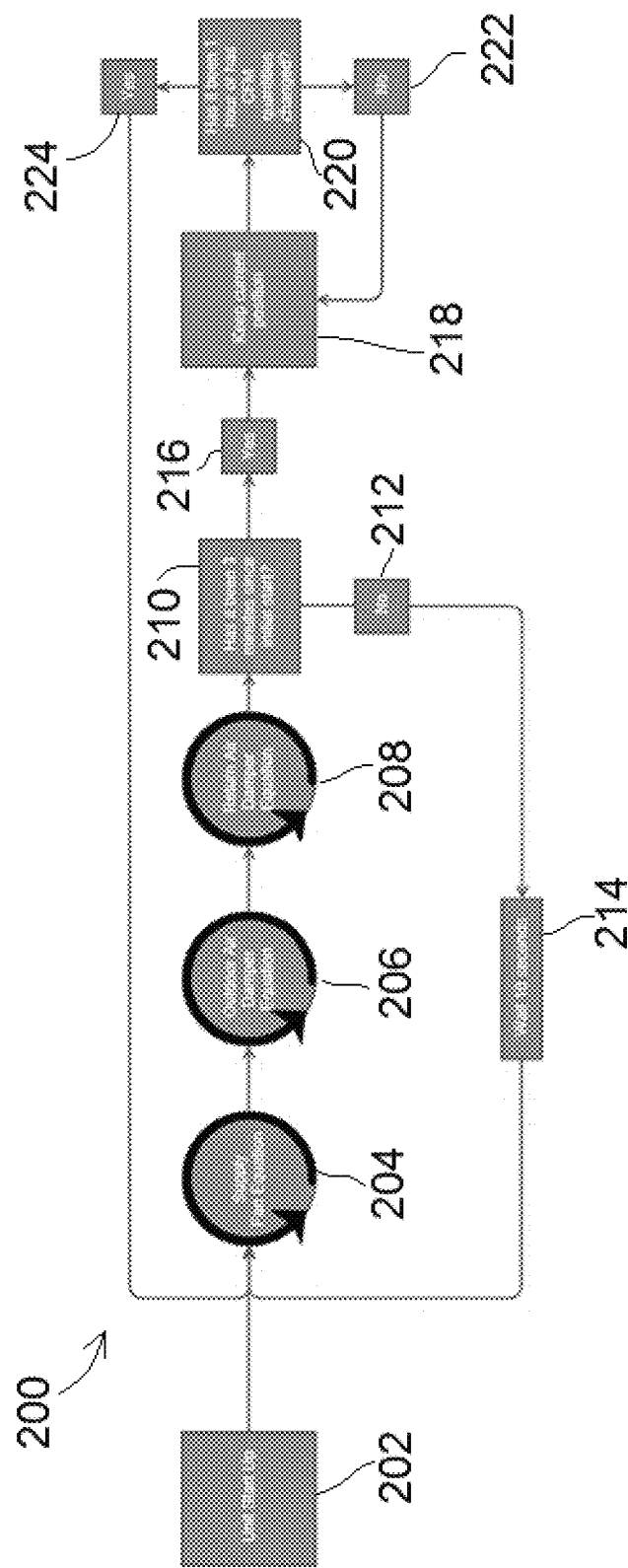
FIG. 5 is a flow diagram showing a method of adjusting a plurality of mechanical components within a temperature control unit of an HVAC system.

As set out in more detail in FIG. 5, the method steps in FIG. 2 may be carried out sequentially for each of the plurality of mechanical components, and once the steps have been carried out for each of the plurality of components a first time, the steps are re-run multiple times for each of the plurality of components sequentially.

The methods described in FIGS. 2 and 3 may be run during an initial calibration of the HVAC system onsite. The controller 40 may be programmed to automatically repeat the method steps in FIGS. 2 and 3 for each mechanical component at pre-determined time intervals. In the exemplary embodiment shown in FIG. 5, the method may be re-run every hour. Other time periods may also be used and the optimum length of time between calibrations may be determined based on the various considerations such as the variability of the unit, cost and the relative importance of maintaining precise conditions in the interior space. The controller may be programmed to automatically repeat the steps in FIG. 2 for each of the plurality of mechanical components when the controller requires a change in flow rate inside the temperature control units.

It is desired that in certain embodiments of the method the self-balancing unit will fully remove the need for an air test and balance technician. The HVAC unit will be able to monitor and control the outside air, supply air and/or return air in real time. The unit may allow for easy integration with any control strategy with a plug and play approach.

The steps described in FIGS. 2 and 3 may be repeated for each damper within the temperature control unit. The method steps in FIG. 2 or 3 may be applied to each of the outdoor air damper, the return air damper and the bypass air damper of the exemplary HVAC unit described in FIG. 1. In other control units having different configurations, such as those with only two dampers, the method steps may be applied to both dampers.

The methods in FIGS. 2 and 3 allows for the calibration of each of the plurality of mechanical components independently from each other. After each of the plurality of mechanical components has been independently calibrated in the steps in FIGS. 2 and 3, the independent calibration of each of the plurality of components may be repeated until each of the plurality of mechanical components has a desired condition that differs from the estimated condition by less than the threshold value for each of the plurality of mechanical components. The independent calibration may also be repeated for a fixed time interval or for a fixed number of iterations of adjustments of the mechanical components rather than using a threshold value.

As shown in the example in FIG. 5, the method steps in FIG. 2 may also be applied to other mechanical components of the temperature control unit of the HVAC system, including, for example, the supply fan. Similarly, in for each of the plurality of mechanical components being calibrated in FIG. 3, the steps of measuring 82, calculating 84, determining 86, comparing 88 and changing 90 may be performed for each of a plurality of mechanical components. The steps in FIGS. 2 and 3 may be repeated until the difference between the estimated condition of the mechanical component and the desired condition of the component is within a threshold value or until a certain length of time or number of iterations have been completed. The steps may be repeated sequentially for each of the plurality of mechanical components.

An exemplary set of equations for calculating an estimated condition of the mechanical component based on the measured property and based on known qualities of the temperature control unit is set out below.

The following section will describe an exemplary method of calculating the flowrate through each of the dampers as well as over the Supply Fan through the use of Bernoulli's equation.

Equation 1 (shown below) is a Bernoulli's equation describing the airflow between two different reference points. After rearranging it can be applied over each of the two dampers (OAD and RAD) as well as over the supply fan to determine the flowrate.

$$P_1 = P_2 + \rho \frac{V_{1-2}^2}{2} + \Delta P_{1-2} \qquad (1)$$

$V_{1-2}$=Velocity of the air through the damper or supply fan
$P_1$=Static pressure of the air at reference point 1
$P_2$=Static pressure of the air at reference point 2
$\Delta P_{1-2}$=Pressure loss from reference point 1 to 2

$$V_m = \frac{Q_{1-2}}{F_{1-2}A_{1-2}}$$

$Q_{1-2}$=Air Flowrate through the damper or supply fan
$F_{1-2}$=Factor of opening of the damper (Supply fan F=1)
$A_{1-2}$=Cross-sectional area of the flow path.

$$\Delta P_{1-2} = \varphi_{1-2}\rho\frac{V_{1-2}^2}{2}$$

$\rho$=Density of the air
$\phi_{1-2}$=Outdoor air damper pressure loss coefficient
Subbing in the relevant terms and rearranging we obtain, $$\frac{P_1}{\rho} = \frac{P_2}{\rho} + 0.5(1+\varphi_{1-2})\left(\frac{Q_{1-2}}{F_{1-2}A_{1-2}}\right)^2 \quad (2)$$

Therefore, $$(F_{1-2}A_{1-2}) = \frac{Q_{1-2}}{\sqrt{\frac{2(P_1-P_2)}{\rho(1+\varphi_{1-2})}}} \quad (3)$$

Equation 3 above gives the damper opening given a desired airflow, current pressure reading and pressure loss coefficient. The pressure loss coefficient is determined experimentally for each damper or fan based on its particular design. This may be conducted using factory testing. Once this value is achieved the damper will be able to automatically adjust to its new position.

Figure 4:
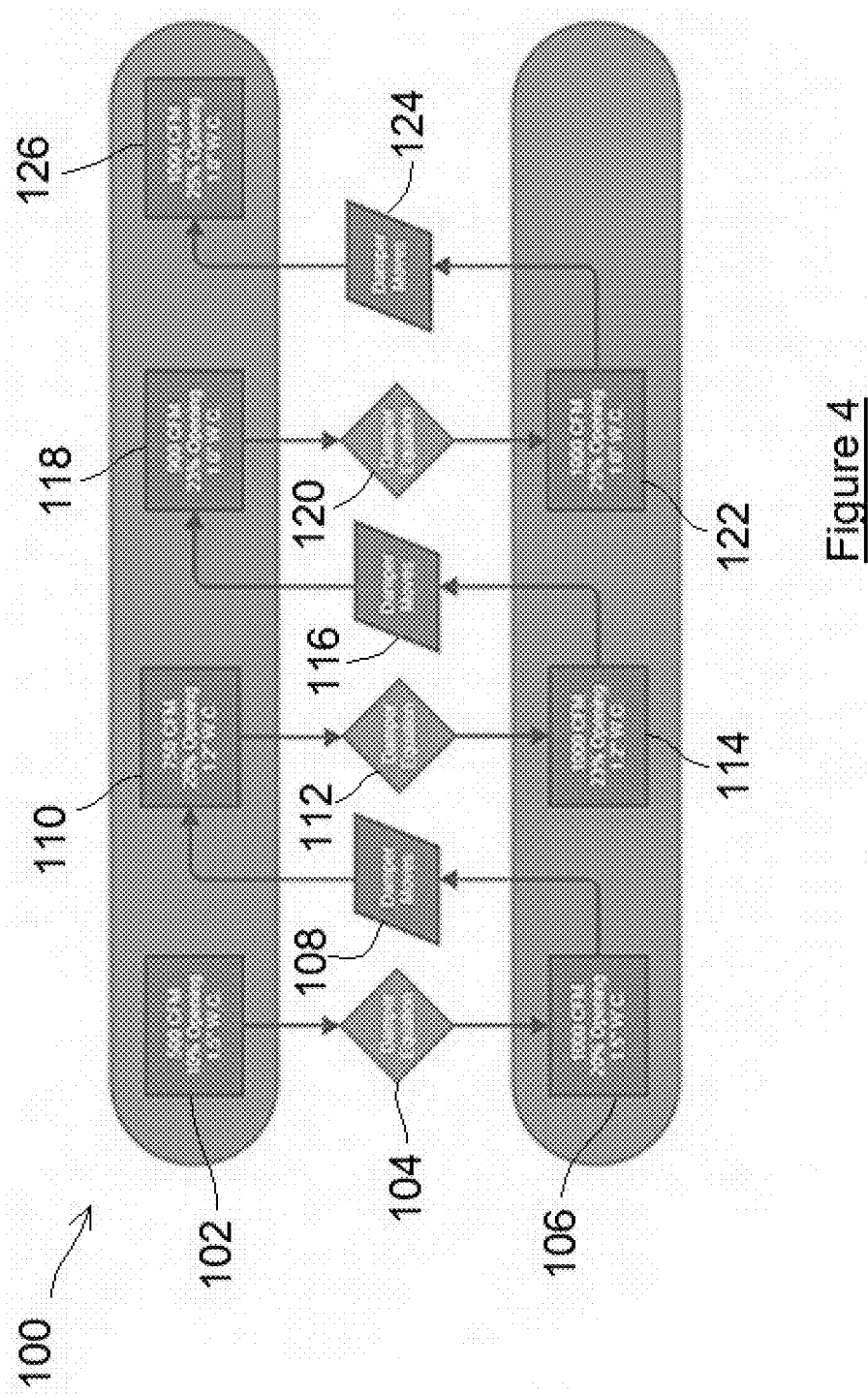
FIG. 4 is a flow diagram showing a method of adjusting a mechanical component within a temperature control unit of an HVAC system.

An exemplary implementation of the method of FIG. 2 is shown generally at 100 in FIG. 4. An opening of a damper will result in a slight decrease in pressure difference and a closing of the damper will result in a slight increase in pressure difference. These small pressure changes may result in the damper having to adjust slightly more to achieve the correct supply airflow. Iterative calculations allow for a converging damper position without constant movement. In this example, the desired outcome is an airflow of 1000 CFM, the damper being 25 percent open and 1.0 inches of water column (W.C.). The reference characters 102, 110, 118 and 126 reference a value corresponding to the actual or current position of the damper. The reference characters 106, 114 and 122 reference a value corresponding to the theoretical position of the damper. During the iterative operation of the method, the first step is 102, where the damper has a position that corresponds to 500 CFM, 10% opening and 1.5" W.C. The damper equation is run at 104 and the theoretical desired position is determined to be 1000 CFM, 20% opening and 1.5" W.C. The controller then moves the damper at 108 to the desired position at 110. At 112, the equation is re-run and the theoretical desired position has shifted to 1000 CFM, 22% opening and 1.2" W.C. at 114. The damper is moved to this position at step 116 to the new actual position at 118. The damper equation is run again at 120 and the theoretical desired position is determined to be 1000 CFM, 25% opening and 1.0" W.C. at 122. The damper moves again in step 124 and the desired outcome is reached at 126. Although not shown in FIG. 4, the damper equation may be run after the desired outcome has been reached to confirm that the desired position and the actual position are separated by an acceptable threshold amount.

The steps shown in FIG. 4 are specific to one mechanical part of the system such as a damper or supply fan. Differential pressure changes will also be affected by other dampers and fans in the system. Therefore, in a preferred embodiment, the operation of a unit with multiple iterative equations would move each mechanical component to its desired position before rerunning an equation. This will allow the unit to modulate in unison as opposed to one part of the system ignoring future calculations.

As shown in FIG. 5, the calibration and operation of a method of calibration of dampers is shown generally at 200. At 202, the unit is initially started up. The calibration equations such as shown in FIGS. 2 to 4 are run initially for the supply fan to determine a desired property for the supply fan at 204. Next, once the supply fan has its desired property, the equations are run sequentially for the outdoor air damper at 206 and then the return air damper at 208. After each of the equations have been run for each of the components, the equations may be repeated at 210 if it is determined that the unit is in its initial startup mode, for example, if the unit has been on for less than 3 minutes since the initial start at 212. If the unit is in its initial start up mode, the system may pause at step 214 for a prescribed number of seconds, such as 10 seconds in the example provided, and the equations may be rerun. This will continue until the start up phase has been completed.

If the unit is not in its initial startup phase at 216, the system will keep its current position as denoted at 218 until an hour has passed or the CFM quantities have changed at 220. The equations may be run when the controller requires a change in the flow rate. If an hour has not passed and the CFM quantities are not being changed, the damper equations will not be rerun at 222. If an hour has passed or the CFM quantities have changed, the equations will be rerun at 224.

The iteration cycle may also be repeated if desired conditions change. This could include changing supply air for occupied/unoccupied mode, changing outside air for demand control ventilation or exhaust fan interlock or changing return air conditions for dehumidification control.

The use of an hour delay, or other prescribed length of time between adjustment of the mechanical components, allows the control strategy to stop modulation for a fixed time. This will reduce constant movement of the mechanical parts and may improve the lifespan of the unit. The strategy described in FIG. 4 is not reliant on having all the parts mentioned. Units that have outside air damper interlocked with the return air damper can still function with the removal of the return air damper equation. The control strategies are not limited to above examples of HVAC configurations. The process will improve control strategy that requires the air mass flow to be known using a variety of different configurations.

The methods and apparatus described herein may be particularly useful to control the humidity in supermarkets. In those units having a bypass return air, the system may control the amount of air being treated by the evaporator. This may allow the unit to drop its suction temperature and increase dehumidification.

Calculating the exact amount of air being treated by the coil may allow for the use of psychrometric calculations for predictive performance. The result is a unit that can intuitively load or unload the coil in order to meet exact sensible and latent load requirements for a space.

Demand control ventilation and exhaust fan interlock can be set up prior to unit installation for immediate results. This may remove the necessity for existing processes where an air testing and balancing technician would have to test multiple conditions. The technician manually adding these points to our controller also poses a risk of changing incorrect values. With a method of self-balancing unit, the controls may be pre-set and installed during manufacturing.

The self-balancing unit may be used to improve unit diagnostics. Psychrometric calculations can be run based off the air passing over each coil and compared to actual sensor readings. Poor comparisons could mean either a bad compressor, heat exchanger or control wiring. This can also be coupled with logged performance data for that specific unit for historical readings.

The logged data will provide information regarding typical pressure differences over dampers. Significant changes could indicate human interference from a technician manually overriding actuators. If this occurs a control system may contact the store directly as to why the change was made and discuss if a better solution exists.

Although the invention is described in terms of particular implementations, it is to be understood that the invention is not limited in its application to the details of construction and to the arrangements of the components set forth in the description or illustrated in the drawings. The invention is capable of other embodiments and of being practiced and carried out in various ways without departing from the scope of the invention. Accordingly, the scope of the claims should not be limited to the preferred embodiments set forth in the examples, but should be given the broadest interpretation consistent with the description as a whole.

In the claims, the word "comprising" is used in its inclusive sense and does not exclude the possibility of other elements being present. The indefinite article "a/an" before a claim feature does not exclude more than one of the feature being present unless it is clear from the context that only a single element is intended.

We claim:

1. A method of self-balancing a plurality of mechanical components within a air handling unit of an HVAC system using a controller, each of the plurality of mechanical components being adjustable by the controller to vary airflow within the air handling unit, the air handling unit fluidly connected to a conditioned space and to an exterior environment, the air handling unit further comprising a housing containing an interior chamber and at least one coil within the interior chamber, the plurality of mechanical components within the air handling unit comprising:

at least one return air damper for varying airflow on a return path from the conditioned space through the at least one coil;

at least one outside air damper for varying airflow on an outside path from the exterior environment through the at least one coil; and at least one bypass air damper for varying airflow on a bypass path from the conditioned space through the interior chamber and back to the conditioned space that bypasses the at least one coil, the bypass path meeting the outside path only after the at least one coil;

the air handling unit having physical attributes affecting airflow within the air handling unit, the method comprising: determining that a humidity value of the conditioned space is above a predetermined range of the humidity value; and in response, increasing the airflow on the bypass path and reducing the airflow on the return path by, for each of the plurality of mechanical components:

i. measuring a pressure value associated with the mechanical component having a current property, wherein measuring the pressure value associated with the mechanical component comprises measuring a differential pressure across the mechanical component;

ii. determining a desired airflow through the air handling unit from a plurality of input values comprising the measured humidity value, the predetermined humidity value range, and a desired airflow across the at least one coil;

iii. calculating an estimation of a desired property of the mechanical component based on the measured pressure value, the desired airflow through the air handling unit and the physical attributes known qualities of the air handling unit;

iv. changing the current property of the mechanical component to the estimated desired property; and v. repeating the steps (i) through (iv) until a set precondition is met.

2. The method of claim 1 in which the set precondition is met when the calculated difference between the desired property of the mechanical component and the current property of the mechanical component is within a threshold value.

3. The method of claim 1 in which the set precondition is met when a predetermined time interval has elapsed.

4. The method of claim 1 in which the steps (i) through (v) are repeated sequentially for each of the plurality of dampers.

5. The method of claim 1 in which the desired property of each of the outside air damper, the return air damper, and the bypass air damper is the desired position of the damper and the current property of each of the plurality of dampers is the current position of the damper.

6. The method of claim 1: in which the plurality of mechanical components further comprise a supply fan; in which estimating a desired property of the supply fan comprises estimating a desired airflow rate across the supply fan from the plurality of input values; and in which the desired airflow across the at least one coil comprises a flow rate across the at least one coil above a minimum flow rate.

7. The method of claim 6 in which the steps (i) through (v) are initially carried out sequentially for each of the plurality of mechanical components, and once the steps (i) through (v) have been carried out for each of the plurality of mechanical components a first time, the steps are re-run multiple times for each component sequentially for each of the plurality of mechanical components.

8. The method of claim 7 in which the calculation steps (i) through (v) are carried out during an initial setup of the HVAC system onsite.

9. The method of claim 8 in which the controller is programmed to automatically repeat the method steps (i) to (v) for each of the plurality of mechanical components when the controller of the air handling unit requires a change in flow rate or a set time has passed.

10. A method of varying a flow rate through at least one damper within a air handling unit of an HVAC system using a controller, the air handling unit fluidly connected to a conditioned space and to an exterior environment, the air handling unit further comprising a housing containing an interior chamber and at least one coil within the interior chamber, the plurality of mechanical components within the air handling unit comprising:

at least one return air damper for varying airflow on a return path from the conditioned space through the at least one coil;

at least one outside air damper for varying airflow on an outside path from the exterior environment through the at least one coil, and at least one bypass air damper for varying airflow on a bypass path from the conditioned space through the interior chamber and back to the conditioned space that bypasses the at least one coil, the bypass path meeting the outside path only after the at least one coil;

the air handling unit having physical attributes affecting airflow within the air handling unit, the method comprising:

determining that a measured humidity value of the conditioned space is above a predetermined humidity value range; and in response, increasing the airflow on the bypass path and reducing the airflow on the return path by:

a) measuring a pressure inside the air handling unit, wherein measuring the pressure inside the air handling unit comprises measuring the differential pressure across at least one of the return path, the outside path, or the bypass path;

b) calculating an estimated value of a flow rate through the at least one of the return path, the outside path and the bypass path based on the measured pressure and based on the physical attributes known qualities of the air handling unit;

c) determining a desired flow rate through the at least one of the return path, the outside path and the bypass path based on a desired indoor air condition within the conditioned space from a plurality of input values comprising the measured humidity value, the predetermined humidity value range, and a desired airflow across the at least one coil;

d) comparing the estimated flow rate to the desired flow rate; and e) changing the position of the at least one of the at least one bypass air damper, the at least one return air damper, and the at least one outdoor air damper to more closely align the estimated flow rate to the desired flow rate to achieve the desired indoor air quality.

11. The method of claim 10 in which the method further comprises repeating the steps (a) through (e) for the at least one damper until the difference between the estimated flow rate and the desired flow rate is less than a pre-determined threshold value.

12. A method of self-balancing a plurality of mechanical components within a air handling unit of an HVAC system using a controller, the air handling unit fluidly connected to a conditioned space and to an exterior environment, the air handling unit further comprising a housing containing an interior chamber and at least one coil within the interior chamber, the plurality of mechanical components within the air handling unit comprising:

at least one return air damper for varying airflow on a return path from the conditioned space through the at least one coil;

at least one outside air damper for varying airflow on an outside path from the exterior environment through the at least one coil; and at least one bypass air damper for varying airflow on a bypass path from the conditioned space through the interior chamber and back to the conditioned space that bypasses the at least one coil, the bypass path meeting the outside path only after the at least one coil;

each of the plurality of mechanical components being adjustable by the controller to vary airflow within the air handling unit, the air handling unit having physical attributes affecting airflow within the air handling unit, the method comprising:

determining that a measured humidity value of the conditioned space is above a predetermined humidity value range; and in response, increasing the airflow on the bypass path and reducing the airflow on the return path by, for each of the plurality of mechanical components:

i. measuring a property of the mechanical component, wherein measuring the property of the mechanical component comprises measuring a differential pressure across at least one of the return path, the outside path, or the bypass path;

ii. calculating an estimated condition of the mechanical component based on the measuring of the differential pressure across at least one of the return path, the outside path, or the bypass path and based on the physical attributes known qualities of the air handling unit;

iii. determining a desired condition for the mechanical component based on a desired air condition within the HVAC system or conditioned space from a plurality of input values comprising the measured humidity value, the predetermined humidity value range, and a desired airflow across the at least one coil;

iv. comparing the estimated condition of the mechanical component to the desired condition of the mechanical component;

v. changing the condition of the mechanical component using the controller to more closely align the estimated condition to the desired condition to achieve the desired indoor air condition; and vi. repeating the steps (a) through e) until the difference between the estimated condition of the mechanical component and the desired condition of the mechanical component is within a threshold value.

13. The method of claim 12 in which the steps (a) through (f) are repeated sequentially for each of the plurality of dampers.

14. The method of claim 13 in which estimating a condition of each of the plurality of dampers comprises estimating a value of a flow rate across the damper.

15. The method of claim 13 in which the steps (a) through (f) are repeated for each of the outdoor air damper, the return air damper and the bypass air damper.

16. The method of claim 13: in which the plurality of mechanical components further comprise a supply fan, in which estimating a condition of the supply fan comprises estimating a value of a flow rate across the supply fan from the plurality of input values; and in which the desired airflow across the at least one coil comprises a flow rate across the at least one coil above a minimum flow rate.

17. The method of claim 16 in which the steps (a) through (f) are initially carried out sequentially for each of the plurality of mechanical components, and once the steps (a) through (f) have been carried out for each of the plurality of mechanical components a first time, the steps are re-run multiple times for each component sequentially for each of the plurality of mechanical components.

18. The method of claim 17 in which the calculation steps (a) through (f) are carried out during an initial setup of the HVAC system onsite.

19. The method of claim 18 in which the controller is programmed to automatically repeat the method steps (a) to (f) for each mechanical component at pre-determined time intervals.

20. The method of claim 19 in which the controller is programmed to automatically repeat the method steps (a) to (f) for each of the plurality of mechanical components when a change in flow rate across the air handling unit is detected by the controller.

21. A method of self-balancing a plurality of mechanical components within a air handling unit of an HVAC system using a controller, the air handling unit fluidly connected to a conditioned space and to an exterior environment, the air handling unit further comprising a housing containing an interior chamber and at least one coil within the interior chamber, the plurality of mechanical components within the air handling unit comprising:

at least one return air damper for varying airflow on a return path from the conditioned space through the at least one coil;

at least one outside air damper for varying airflow on an outside path from the exterior environment through the at least one coil; and at least one bypass air damper for varying airflow on a bypass path from the conditioned space through the interior chamber and back to the conditioned space that bypasses the at least one coil, the bypass path meeting the outside path only after the at least one coil; each of the mechanical components having conditions that are adjustable by the controller for varying the airflow within the air handling unit, the air handling unit having physical attributes affecting airflow within the air handling unit, the method comprising:

a) setting up each of the plurality of mechanical components independently from each other by carrying out the following steps for each of the plurality of components:

i. measuring a property of the mechanical component, wherein measuring the property of the mechanical component comprises measuring a differential pressure across at least one of the return path, the outside path, or the bypass path;

ii. calculating an estimated condition of the mechanical component based on the measuring of the differential pressure across at least one of the return path, the outside path, or the bypass path and based on the physical attributes known qualities of the air handling unit;

iii. determining a desired airflow condition for the mechanical component from a plurality of input values comprising the measured humidity value, the predetermined humidity value range, and a desired airflow across the at least one coil;

iv. comparing the estimated condition of the mechanical component to the desired condition of the mechanical component;

v. changing the airflow condition of the mechanical component using the controller to more closely align the estimated condition to the desired condition to achieve the desired indoor air condition; and vi. repeating the steps (i) through (v) until the difference between the estimated condition of the mechanical component and the desired airflow condition of the mechanical component is within a threshold value for that mechanical component;

b) after each of the plurality of mechanical components has been independently calibrated in step a), repeating the independent calibration of each of the plurality of mechanical components in step a) until each of the plurality of mechanical components has a desired condition that differs from the estimated condition by less than the threshold value for each of the plurality of mechanical components.

22. The method of claim 21 in which the calibration steps in a) and b) are initiated when the HVAC unit is initially installed into an interior building envelope.

23. The method of claim 22 in which the calibration steps in a) and b) are repeated at regular intervals during operation of the HVAC system.

* * * * *